United States Patent [19]

Hagiwara et al.

[11] 4,410,070

[45] Oct. 18, 1983

[54] DISC BRAKE

[75] Inventors: Yutaka Hagiwara, Fujisawa; Tetu Yamazaki, Yokohama, both of Japan

[73] Assignee: Nissan Motor Co., Ltd., Yokohama, Japan

[21] Appl. No.: 265,387

[22] Filed: May 20, 1981

[30] Foreign Application Priority Data

May 28, 1980 [JP] Japan .............................. 55-73366[U]

[51] Int. Cl.³ .......................................... F16D 55/224
[52] U.S. Cl. ................................ 188/73.36; 188/73.31
[58] Field of Search ................. 188/71.1, 73.31, 73.35, 188/73.36

[56] References Cited

U.S. PATENT DOCUMENTS 4,067,418  1/1978  Rath et al. ........................ 188/73.36

FOREIGN PATENT DOCUMENTS 2919075  1/1980  Fed. Rep. of Germany .
2268189 11/1975  France .
2426838 12/1979  France .
55-47023  4/1980  Japan .............................. 188/73.35
1130549 10/1968  United Kingdom .
2024348  1/1980  United Kingdom ............ 188/73.31

Primary Examiner—Duane A. Reger
Attorney, Agent, or Firm—Thompson, Birch, Gauthier & Samuels

[57] ABSTRACT

In a disc brake of a type having a caliper slidably supported and having, on one side of a disc, a cylinder containing therein a piston for loading an inner pad against the disc and, on the other side of the disc, a limb portion for loading an outer pad against the disc, the flexural rigidity of the limb portion is made less on a leading side thereof located upstream with respect to the rotational direction of the disc for loading a leading or upstream side of the outer surface of the outer pad relating to a trailing side of said limb portion located downstream with respect to the rotational direction of the disc for loading a trailing or downstream side of the outer surface of the outer pad, so as to prevent frictional vibrations of the outer pad.

4 Claims, 5 Drawing Figures

DISC BRAKE

BACKGROUND OF THE INVENTION

The present invention relates generally to a disc brake, and more specifically to a disc brake of a floating caliper type in which one pad is loaded against a brake disc by a piston and the other pad is loaded against the brake disc by a limb portion extending from a caliper.

Among various kinds of disc brakes, widely used is a fist type disc brake. In a conventional fist type disc brake, however, the outer pad is loaded by a limb portion extending from a caliper with even pressure between a leading side portion of the outer pad upstream with respect to the direction of the disc rotation and a trailing side portion of the outer pad downstream with respect to the direction of the disc rotation. Therefore, the leading side portion of the outer pad is liable to cause a frictional vibration which produces undesired brake noises such as brake squeal.

BRIEF SUMMARY OF THE INVENTION

It is an object of the present invention to provide a disc brake arranged to reduce a frictional vibration of a friction pad to reduce undesired brake noises.

The disc brake for a vehicle wheel of the present invention is of a type having a disc connected with the vehicle wheel for rotation therewith, an inner pad and an outer pad disposed on opposite sides of the disc and movable into braking engagement with the disc, a support member to be fixed to a vehicle body for supporting the pads movably, a caliper slidably supported by the support member and having, on one side of the disc, a cylinder containing therein a piston for loading the inner pad against the disc and, on the other side of the disc, a limb portion for loading the outer pad against the disc.

According to the present invention, the flexural rigidity of the limb portion of the caliper is made smaller on a leading side thereof located upstream with respect to the direction of the disc rotation for loading a leading or upstream side within the outer surface of the outer pad than on a trailing side of the limb portion located downstream with repect to the direction of the disc rotation for loading a trailing or downstream side within the outer surface of the outer pad.

DETAILED DESCRIPTION OF THE INVENTION

Figure 1:
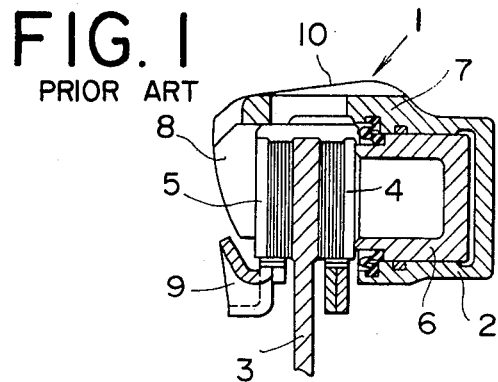
FIG. 1 is a sectional view of a conventional fist type disc brake.
Figure 2:
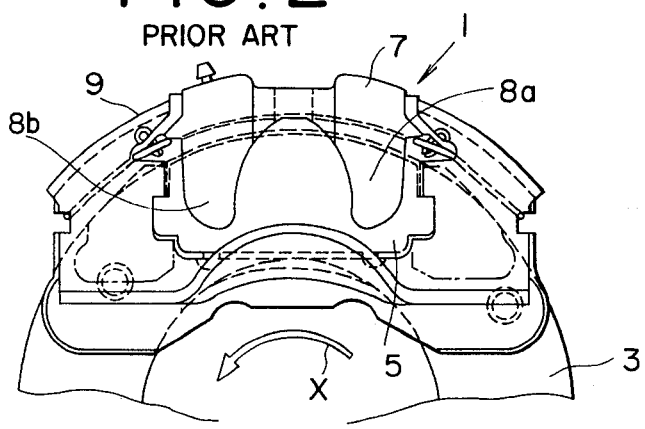
FIG. 2 is a front view showing branch portions of a caliper of a conventional fist type disc brake.

To facilitate understanding the present invention, a reference will be made to a conventional fist type disc brake 1 shown in FIG. 1. In FIG. 1, a hydraulic cylinder 2 formed in a caliper 7 is used as an actuator, and this cylinder 2 is disposed on one side (inner side) of a disc 3 which is rotatable integrally with a vehicle wheel. A pair of pads, an inner pad 4 and an outer pad 5, are disposed on each side of the disc 3, and arranged to be pressed against the disc 3. The inner pad 4 is loaded against the disc 3 by a piston 6 which is slidably contained in the cylinder 2. The caliper 7 has a bridge portion 10 which extends from the cylinder 2 across the periphery of the disc and a limb portion 8 extending from the bridge portion 10. When the piston 6 pushes the inner pad 4 against the disc 3, resulting reaction causes the caliper 7 to slide in the direction opposite to the movement of the piston 6. Thus the outer pad 5 is loaded against the disc 3 by the limb portion 8 of the caliper 7. The limb portion 8 of the caliper 7 is formed with two branch portions 8a and 8b separated in a bifurcate shape, as shown in FIG. 2. The branch portions 8a and 8b of the limb portion 8 are arranged to push, respectively, the right and the left sides, as shown in FIG. 2, on the outer surface of the outer pad 5, thus forcing the outer pad 5 into braking engagement with the disc 3. A support member 9 for securing the disc brake body 1 to the vehicle body, supports slidably the caliper 7.

In such a conventional disc brake, however, the branch portions 8a and 8b of the limb portion 8 are so formed as to have the same shape in section and, therefore, have equal rigidity, so that the right and left sides on the outer pad face are pressed with equal pressure during braking application. Therefore, a leading edge (right side edge in FIG. 2) of the outer pad 5 on an upstream side with respect to the rotational direction of the disc 3 tends to stick to the rotating surface of the disc 3 because of the rotating disc 3 dragging the leading edge of the outer pad 5 along with it. Then reacting against this motion, the leading edge of the outer pad 5 rebounds to the original state, and this cycle is repeated, producing a self-excited vibration which is a cause of braking noises such as brake squeal. This vibration is increased by increasing the force presssing the leading edge of the outer pad 5. Such a vibration is not produced at a trailing edge opposite to the leading edge, of the outer pad located on the downstream side with respect to the direction of the rotor rotation, regardless of the pressing force, because the trailing edge of the outer pad 5 is not dragged into the frictional interface.

Figure 3:
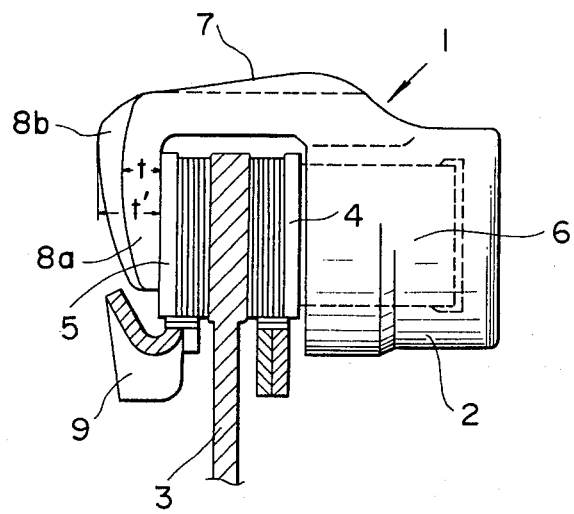
FIG. 3 is a side view of a disc brake embodying the present invention.

In view of the above description of a fist type disc brake, reference is now made to FIG. 3, wherein a preferred embodiment of the disc brake of the present invention is illustrated.

In FIG. 3, a limb portion 8 of a caliper 7 has a leading branch portion 8a for pushing a leading side of the outer surface of an outer pad 5 which is a side located upstream with respect to the forward direction X of the disc rotation corresponding to the forward movement of the vehicle, and a trailing branch portion 8b for pushing a trailing side, or a downstream side with respect to the forward direction X of the disc rotation, of the outer surface of the outer pad 5. The rigidity of the leading branch portion 8a of the caliper 7 is made smaller than that of the trailing branch portion 8b by making the thickness t of the leading branch portion 8a smaller to a desired extent than the thickness t' of the trailing branch portion 8b.

Figure 4:
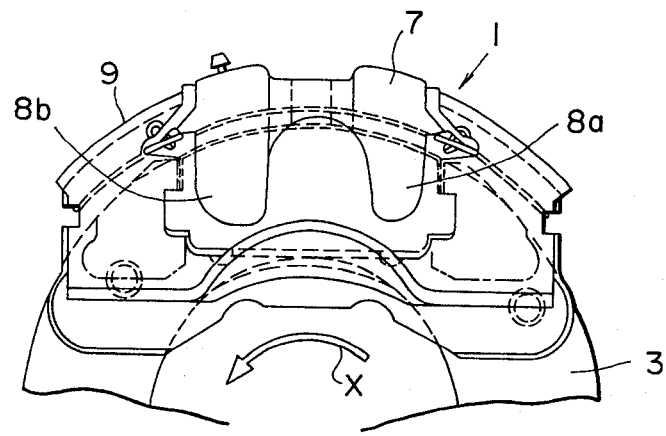
FIG. 4 is a front view showing another embodiment of the present invention.

As shown in FIG. 4, the rigidity of the leading branch portion 8a can be reduced by making the width of the leading branch portion 8a smaller than the width of the trailing branch portion 8b. Such a reduction of the width of the leading branch portion 8a may be added to the above mentioned thickness reduction of the leading branch portion 8a.

Figure 5:
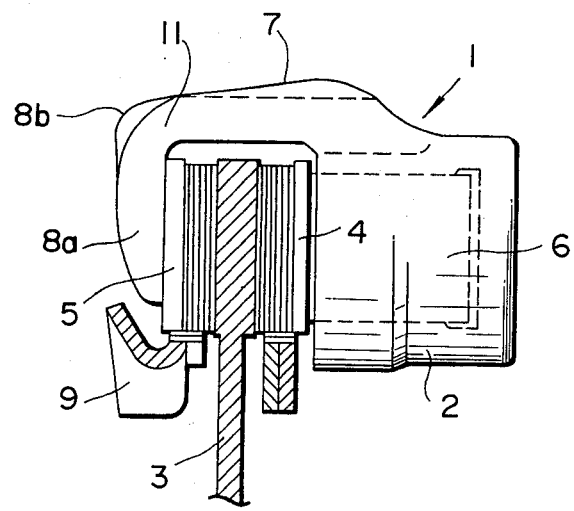
FIG. 5 is a side view showing a further embodiment of the present invention.

The leading and trailing branch portions 8a and 8b of the limb portion 8 extend substantially perpendicularly from a bridge portion 10 of the caliper 7. Accordingly, it is also possible to reduce the rigidity of the leading branch portion 8a by reducing the thickness or the width of a bent portion 11 of the leading branch portion 8a, as shown in FIG. 5.

As explained above, the rigidity of the leading branch portion 8a is made less than that of the trailingf branch portion 8b, so that the pressure exerted upon the leading side of the outer pad 5 becomes smaller than that of the trailing side. Therefore, this construction according to the present invention can prevent a frictional vibration produced at the leading edge of the outer pad 5, and thus eliminates the major cause of undesirable brake noises such as brake squeal. Needless to say, the rigidity of the leading branch portion 8a should not be reduced to such an extent that it affects braking effectiveness.

According to the present invention, the floating caliper type disc brake in which one pad is loaded against the brake disc by the piston and the other pad is loaded against the brake disc by the limb portion extending from the caliper body, is arranged such that the flexural rigidity of the limb portion is smaller on the leading side thereof for loading the leading side of the outer pad than on the trailing side of the limb portion for loading the trailing side of the outer pad. Thus, brake noises are significantly reduced by changing only to a small extent a metal mold for making the limb portion, and this is also achieved by slightly reworking the limb portion having a conventional configuration.

What is claimed is:

1. A disc brake for a vehicle wheel, said disc brake comprising:
   a disc connected with the vehicle wheel for rotation therewith,
   an inner pad and an outer pad disposed on opposite sides of said disc and movable into braking engagement with said disc,
   a support member adapted to be fixed to a vehicle body for supporting said pads movably, and
   a caliper slidably supported by said support member and having, on one side of said disc, a cylinder containing therein a piston for loading said inner pad against said disc and, on the other side of said disc, a limb portion for loading said outer pad against said disc,
   the flexural rigidity of said limb portion being less on the leading side thereof located upstream with respect to the direction of the disc rotation for loading the upstream side of the outer surface of said outer pad relative to the trailing side of said limb portion located downstream with respect to the direction of the disc rotation for loading the downstream side of the outer surface of said outer pad,
   said limb portion of said caliper being formed in a bifurcate shaping having two branch portions, the upstream branch portion for loading said leading side of said outer surface of said outer pad, and a trailing branch portion for loading said trailing side of said outer surface of said outer pad, the thickness of said leading branch portion being less than the thickness of said trailing branch portion.

2. A disc brake for a vehicle wheel, said disc brake comprising:
   a disc connected with the vehicle wheel for rotation therewith;
   an inner pad and an outer pad disposed on opposite sides of said disc and movable into braking engagement with said disc,
   a support member adapted to be fixed to a vehicle body for supporting said pads movably, and
   a caliper slidably supported by said support member and having, on one side of said disc, a cylinder containing therein a piston for loading said inner pad against said disc and, on the other side of said disc, a limb portion for loading said other pad against said disc,
   the flexural rigidity of said limb portion being less on the leading side thereof located upstream with respect to the direction of the disc rotation for loading the upstream side of the outer surface of said outer pad relative to the trailing downstream with respect to the direction of the disc rotation for loading the downstream side of the outer surface of said outer pad,
   said limb portion of said caliper being formed in a bifurcate shape having two branch portions, the upstream branch portion for loading said leading side of said outer surface of said outer pad, and a trailing branch portion for loading said trailing side of said outer surface of said outer pad, the width of said leading branch portion being less than the width of said trailing branch portion.

3. A disc brake for a vehicle wheel, said disc brake comprising:
   a disc connected with the vehicle wheel for rotation therewith,
   an inner pad and outer pad disposed on opposite sides of said disc and movable into braking engagement with said disc,
   a support member adapted to be fixed to a vehicle body for supporting said pads movably, and
   a caliper slidably supported by said support member and having, on one side of said disc, a cylinder containing therein a piston for loading said inner pad against said disc and, on the other side of said disc, a limb portion for loading said outer pad against said disc,
   the flexural rigidity of said limb portion being less on the leading side thereof located upstream with respect to the direction of the disc rotation for loading the upstream side of the outer surface of said outer pad relative to the trailing side of said limb portion located downstream with respect to the direction of the disc rotation for loading the downstream side of the outer surface of said outer pad,
   said limb portion of said caliper being formed in a bifurcate shape having two branch portions, the upstream branch portion for loading said leading side of said outer surface of said outer pad, and a trailing branch portion for loading said trailing side of said outer surface of said outer pad, said caliper having a bridge portion extending across the periphery of said disc, each of said branch portions extending from said bridge portion, each of said branch portions being bent so as to extend substantially parallel with the rotational surface of said disc, the thickness of said bend of said leading branch portion being less than the thickness of said bend of said trailing branch portion.

4. A disc brake for a vehicle wheel, said disc brake comprising:

a disc connected with the vehicle wheel for rotation therewith, an inner pad and an outer pad disposed on opposite sides of said disc and movable into braking engagement with said disc, a support member adapted to be fixed to a vehicle body for supporting said pads movably, and a caliper slidably supported by said support member and having, on one side of said disc, a cylinder containing therein a piston for loading said inner pad against said disc and, on the other side of said disc, a limb portion for loading said outer pad against said disc, the flexural rigidity of said limb portion being less on the leading side thereof located upstream with respect to the direction of the disc rotation for loading the upstream side of the outer surface of said outer pad relative to the trailing side of said limb portion located downstream with respect to the direction of the disc rotation for loading the downstream side of the outer surface of said outer pad, said limb portion of said caliper being formed in a bifurcate shape having two branch portions, the upstream branch portion for loading said leading side of said outer surface of said outer pad, and a trailing branch portion for loading said trailing side of said outer surface of said outer pad, said caliper having a bridge portion extending across the periphery of said disc, each of said branch portions extending from said bridge portion, each of said branch portions being bent so as to extend substantially parallel with the rotational surface of said disc, the width of said bend of said leading branch portion being less than the width of said bend of said trailing branch portion.

* * * * *

UNITED STATES PATENT AND TRADEMARK OFFICE
CERTIFICATE OF CORRECTION

PATENT NO. : 4,410,070
DATED : October 18, 1983
INVENTOR(S) : Yutaka Hagiwara and Tetu Yamazaki It is certified that error appears in the above-identified patent and that said Letters Patent are hereby corrected as shown below:

In column 4, line 10, cancel "other" and insert --outer--

Signed and Sealed this

Seventh Day of February 1984

[SEAL]

Attest:

GERALD J. MOSSINGHOFF

Attesting Officer    Commissioner of Patents and Trademarks